United States Patent [19]
Servel et al.

[11] Patent Number: 4,939,718
[45] Date of Patent: Jul. 3, 1990

[54] ROUTING METHOD AND PACKET SWITCHING NETWORKS HAVING A DISTANCE INDICATOR FOR ROUTING

[75] Inventors: Michel Servel, Lannion; Jean-Paul Quinquis; Albert Lespagnol, both of Perros Guirec, all of France

[73] Assignee: Etat Francais Represente par le Ministre des Postes, Telecommunications, et de l'Espace (Centre National d'Etudes des Telecommunications), Isssy-les-Moulineaux, France

[21] Appl. No.: 335,926

[22] Filed: Apr. 11, 1989

[30] Foreign Application Priority Data

Apr. 20, 1988 [FR] France .................................. 88 05236

[51] Int. Cl.⁵ .............................................. H04J 3/26
[52] U.S. Cl. ....................................... 370/60; 370/60.1; 370/94.1; 370/94.2; 370/85.15
[58] Field of Search ..................... 370/94, 60, 86, 60.1, 370/85.15, 94.1, 94.2

[56] References Cited

U.S. PATENT DOCUMENTS 4,679,189  7/1987  Olson et al. ........................... 370/94

FOREIGN PATENT DOCUMENTS

0176416  10/1984  European Pat. Off. .............. 370/94
0236244  10/1986  Japan ..................................... 370/94

Primary Examiner—Douglas W. Olms
Assistant Examiner—Christopher O. Edwards
Attorney, Agent, or Firm—Lowe, Price, LeBlanc, Becker & Shur

[57] ABSTRACT

A first switching network embodying the invention is a subscriber installation having a chain structure. In the network, the switching is distributed over a plurality of switches each connecting a terminal to the network. A second embodiment is a business network having a star-chain structure and comprising a plurality of sub-networks of chain type. The sub-networks are star connected to central switches which operate in a load sharing mode. According to the method embodying the invention, the terminals connected to the network assume themselves the responsibility for determining communication routes through the network. During a communication set-up phase, caller and callee terminals transmit call packets which are disseminated to all terminals in order to measure two so-called "distances" respectively between the caller and the callee and between the callee and the caller. These distances are after included in data packets for routing said packets.

13 Claims, 7 Drawing Sheets

| St0 | St1 | St2 | D̄/A | BS | CA0$_a$ | CA1$_a$ | CA2$_a$ |
|---|---|---|---|---|---|---|---|
| 1 | 0 | 0 | 0 | 0 | error | 0 | 0 |
| | | | 0 | 1 | 0 | 0 | 0 |
| | | | 1 | 0 | error | 0 | 0 |
| | | | 1 | 1 | 0 | 0 | 1 |
| 0 | 1 | 0 | 0 | 0 | 0 | 0 | 0 |
| | | | 0 | 1 | 0 | 1 | 0 |
| | | | 1 | 0 | error | 0 | 0 |
| | | | 1 | 1 | 0 | 0 | 0 |
| 0 | 0 | 1 | 0 | 0 | error | 0 | 0 |
| | | | 0 | 1 | 0 | 0 | 1 |
| | | | 1 | 0 | error | 0 | 0 |
| | | | 1 | 1 | 0 | 0 | 1 |

FIG. 10 AC="0"

| St0 | St1 | St2 | D̄/A | BS | CA0$_a$ | CA1$_a$ | CA2$_a$ |
|---|---|---|---|---|---|---|---|
| 1 | 0 | 0 | 0 | 0 | 0 | 1 | 0 |
| | | | 0 | 1 | 0 | 0 | 1 |
| | | | 1 | 0 | error | 0 | 0 |
| | | | 1 | 1 | 0 | 0 | 0 |
| 0 | 1 | 0 | 0 | 0 | 0 | 1 | 0 |
| | | | 0 | 1 | 1 | 0 | 0 |
| | | | 1 | 0 | error | 0 | 0 |
| | | | 1 | 1 | 0 | 0 | 0 |
| 0 | 0 | 1 | 0 | 0 | error | 0 | 0 |
| | | | 0 | 1 | 0 | 0 | 1 |
| | | | 1 | 0 | 0 | 0 | 0 |
| | | | 1 | 1 | 0 | 0 | 1 |

FIG. 5

| St0 | St1 | St2 | BS | CA0$_a$ | CA1$_a$ | CA2$_a$ |
|---|---|---|---|---|---|---|
| 1 | 0 | 0 | 0 | 0 | 1 | 0 |
| | | | 1 | 0 | 0 | 1 |
| 0 | 1 | 0 | 0 | 1 | 0 | 0 |
| | | | 1 | 0 | 1 | 0 |
| 0 | 0 | 1 | 0 | error | 0 | 0 |
| | | | 1 | 0 | 0 | 1 |

ROUTING METHOD AND PACKET SWITCHING NETWORKS HAVING A DISTANCE INDICATOR FOR ROUTING

BACKGROUND OF THE INVENTION

This invention relates generally to packet switching. More especially the invention relates to a routing method and networks for switching asynchronous packets and possibly synchronous packets.

Asynchronous time-division switching is the known switching technique most suitable to meet the various constraints applying to the future of the wide band integrated services digital networks (ISDN-WB), notably adaptability, flexibility and evolutionary constraints. This technique provides for self-adaptation of the network enabling transmission with any source rate, which is a decisive advantage in view of the great variety of sources with different natures and performances, which should be connectable to a wide band network. Nevertheless, asynchronous time-division switching requires increased performances from the switches notably very short switching times to compensate for the delays due to buffer queues and to dispose of the high rates. To achieve short switching times, the switches should be of the simplest possible design. In view of present-day circuit integration techniques it is possible, at a reasonable cost, to provide the different terminals connectable to the network with a high level of "intelligence". A solution to simplify the operations performed by the switches would consist in giving to these intelligent terminals responsibility for the choice of the routes to be followed by the packets through the network. The processing algorithms located in the switches are then reduced to their simplest expressions. The use of memories to support translation tables, as included in most known switches, is avoided and the control circuits in the switches can be obtained via a few high-speed logic integrated circuits.

Moreover, the user installations to which the terminals to the wide band network are to be connected also involve problems. Installations of different sizes must be envisaged, from the smallest subscriber installation to the local business network.

It is desirable that a subscriber installation be extendable, from a simple connecting plug for a single terminal to a genuine mini-switching network providing for internal communications between terminals. These mini-networks should remain at an accessible cost level and be simple to use. The homogeneity between the different installations is an important condition in guaranteeing a low cost, simple use and extensibility of the installations. The transmission media, connecting plugs, switching techniques employed should be the same in the different installations. The connecting plugs should be preferably standardized, i.e. be capable of connecting all types of terminals. The user can thus change the location of his terminals without having to modify the installation. Distributed bus and distributed switching ring or chain type structures have been proposed for these installations, notably to minimize the wiring required.

Likewise local business networks should offer guarantees of terminal extensibility and portability. Homogeneity is also an important condition for these installations. Moreover, it is desirable that a local business network should offer the possibility of locating any terminal connected to the network and thus the person to which it is generally specifically attributed.

OBJECTS OF THE INVENTION

The main object of this invention is to provide a packet routing method to be implemented notably in an asynchronous packet time division switching network and making use of the terminals connected to the network for the choice of the packet routes so as to reduce the complexity of the switches included in this network, increase their performances and moreover provide for easy extension of the network.

A further object of the invention is to provide switching networks employing the method as embodied by the invention and designed for subscriber installations and local business networks within the context of the furture wide band networks.

SUMMARY OF THE INVENTION

For this, the method embodying the invention is designed to route packets between first and second bidirectional connection multiplex ways connected to a packet time-division switching network. This network comprises plural packet switches chain-connected, to form a bidirectional packet transmission artery, each switch connecting a bidirectional connection multiplex way to the artery. During a communication set-up phase preliminary to transmission of data packets, the first and second connection multiplex ways transmit via the artery respectively first and second call packets which are disseminated to all the connection multiplex ways so as to measure respectively first and second distances between the switches connecting the first and second multiplex ways to the artery. The first and second distances respectively correspond to a number of switches that should be crossed by a packet transmitted by the first connection multiplex way to reach the second connection multiplex way and a number of switches to be crossed by a packet transmitted by the second connection multiplex way to reach the first connection multiplex way. A call packet includes a distance word, set initially to zero on transmission of the packet, and which is incremented by one, as each switch is crossed, so as to measure the corresponding distance. During a communication phase in which the data packets are transmitted, distance words corresponding to the first and second measured distances are included in the data packets transmitted from the first to the second connection multiplex ways and vice-versa, so as to route said data packets. The distance word included in a data packet is decremented by 1 whenever the packet crossing switch, so that when the packet reaches the switch corresponding to packet addressee, the distance word included in the packet has a null value indicating to the switch that the packet is to be switched to the connection multiplex way connected to that switch.

The method is more especially designed for all tree or chain structure networks or parts of network. These structures have high rate packet transmission arteries or branches forming preferential transmission directions. At a switch in the artery, two data packet switching possibilities are available, towards the preferential direction or towards a branch multiplex way. The data packet is transmitted along the preferential direction as long as the corresponding distance word included in the packet does not have a null value. When the distance word takes on a null value at a switch, the switch is informed that the packet should change direction and it therefore switches the packet towards the branch multiplex way.

A first embodiment of a time-division switching network for implementing the method of the invention, comprises I switches, where I is any integer, which are chain-connected to form a bidirectional packet transmission artery. Each switch connects a respective bidirectional connection multiplex way to the artery, and comprises:

entry means for detecting incoming packets into 3 input multiplex ways and transmit them synchronously;

means linked to the entry means for multiplexing the packets transmitted by the entry means;

a buffer memory for temporarily storing the packets in memory;

means for demultiplexing the packets read cyclically in the buffer memory and transmitting them to 3 output multiplex ways;

and means for processing a distance word included in each incoming packet and switching the incoming packet as a function of a first signalling bit included in the packet and indicating a transmission direction of the packet in the chain artery, as a function of the nature of the packet, i.e. call packet transmitted during a communication set-up phase or data packet, and as a function of the the value of the distance word included in the packet. The distance word represents a number of switches to be crossed by the packet to be routed from a source that transmitted the packet to a destination to which the packet is addressed.

This first network is adapted to form a subscriber installation.

A second embodiment of a time-division switching network for implementing the method of the invention, with chain-star structure, is more especially suited to form a local business network. This second network comprises J chain sub-networks, where J is any integer, and a central switch to which each of the sub-networks is connected by a bidirectional connection multiplex way. The sub-networks are similar to the first network defined above. Call packets transmitted by first and second connection multiplex ways, respectively connected to switches in the first and second sub-networks, are disseminated through the central switch to all the connection multiplex ways. The call packets comprise first, second and third distance words, in order to respectively measure the distances in the first and second sub-networks, and a relative address representing the switching performed by the central switch. The distances and address are included in the form of distance words in the data packet, for the routing of the packets during a communication phase, through the central switch, between the first and second connection multiplex ways.

BRIEF DESCRIPTION OF THE DRAWING

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

Figure 1:
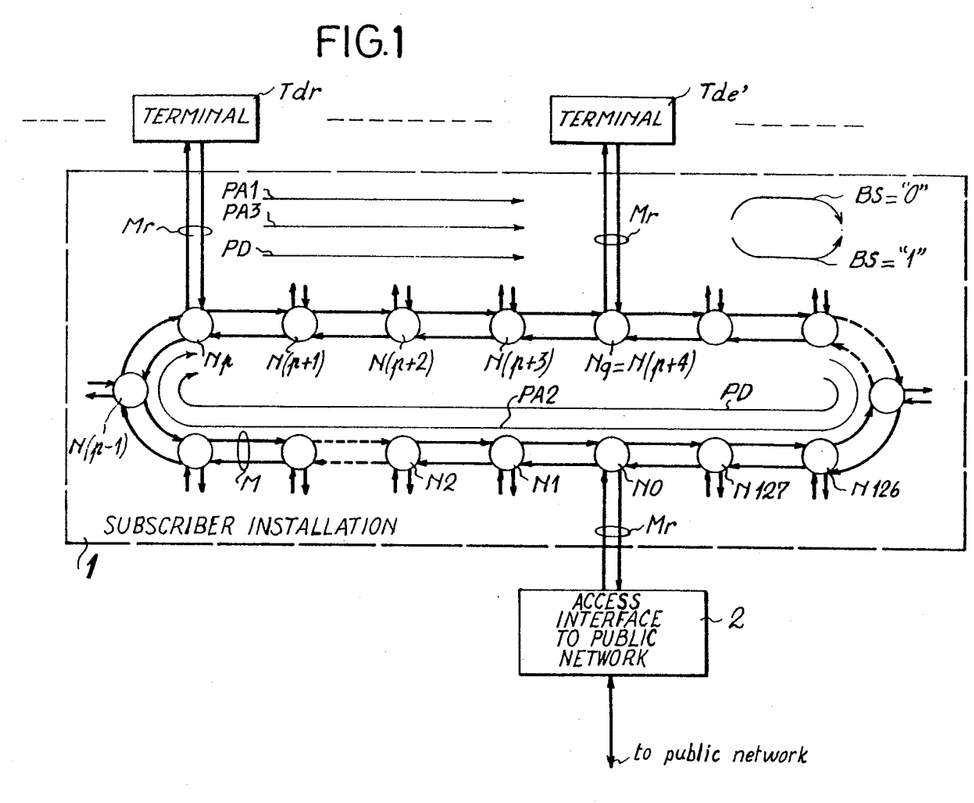
FIG. 1 is a block diagram of first preferred embodiment of a packet time-division switching network in the form of a subscriber chain structure installation.

A first preferred embodiment of a network as embodied by the invention is a subscriber installation 1 of chain type, as shown in FIG. 1. Installation 1 is connected to a public telecommunication digital network, for example of the asynchronous packet time-division switching type.

The subscriber installation 1 includes a number of (I=128) of analogous switching nodes at a maximum, N0 to N127, chain-connected by bidirectional multiplex ways M. Any node in the installation 1, for example N0, is connected by a multiplex connection ways Mr to an access interface 2 to a public network, such an interface T standardized by the European Electronic Standardization Committee (CENELEC) and intended for subscriber installations in an ISDN-WB. The I-1=127 remaining nodes N1 to N127 connect terminals to the subscriber installation 1. Nevertheless, one or several nodes amongst the N1 to N127 can be connected to another chain to form a subscriber installation with two chains of increased capacity. The terminals are each equipped with a suitable interface such as a universal terminal connection interface S at present being standardized by the European Electronic Standardization Committee (CENELEC). The terminals are connected respectively to the corresponding nodes of the installation 1 by multiplex connection ways Mr. An indentification number NI is attributed to each terminal. Likewise, an identification number NI is also attributed to the access interface 2.

Let us consider two terminals Tdr and Tde of the subscriber installation required to communicate together and connected respectively to nodes $N_p$ and $N_q$ of the installation 1. The term terminal is here used in a very broad sense for all equipment connected to a node in the chain via a multiplex connection ways, a terminal itself, an access interface to the public network or a node in another chain of the installation. Prior to the communication during which terminals Tdr and Tde transmit data packets, a communication set-up phase, or call phase, takes place during which terminals Tdr and Tde mutually transmit call packets PA so as to determine and exchange all the data required for the communication.

Generally speaking, in the installation 1 and in the second preferred embodiment of the invention described later, a terminal transmitting a call PA or data PD packet determines the packet direction of transmission in the chain by placing a direction bit BS in the packet.

During the call phase, three call packets PA1, PA2 and PA3 are transmitted between the caller terminal Tdr and callee terminal Tde. Packets PA1 and PA3 are transmitted by terminal Tdr to terminal Tde. Packet PA2 is transmitted by terminal Tde to terminal Tdr. All the call packets PA have a similar structure shown in FIG. 2. The structure shown is not specifically adapted to the installation 1; it is more general structure which is also suited to more complex networks, notably for a second preferred embodiment described later.

Figure 2:
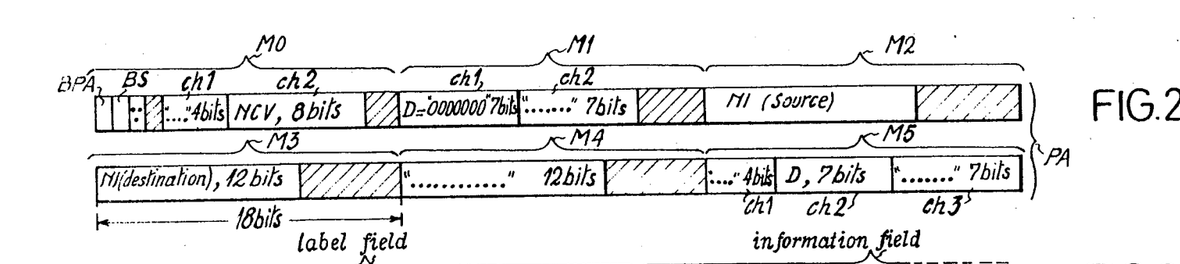
FIGS. 2 and 3 are respectively formal diagrams of call packets and data packets transmitted in the network of in FIG. 1.

Referring to FIG. 2, a call packet PA is composed of 36 octets, only the first six words of 18 bits M0 to M5 are significant. In FIG. 2, only words M0 to M5 of the call packet have been shown. Word M0 includes a header having two signalling bits, BPA and BS, and an empty slot not used for the installation 1 and designed for a third signalling bit. Word M0 also comprises first and second fields ch1 and ch2 respectively having 4 and 8 bits. Bit BPA indicates, when in state "1", a call packet PA. The first field ch1 of word M0 is not used for the installation 1. The second field ch2 of word M0 is designed to contain a virtual circuit number NCV whose use will be specified later. Word M1 includes first and second distance word fields, ch1 and ch2, each having of 7 bits. Field ch1 of word M1 is designed to contain a distance D initialized to "0000000" on transmission of the packet PA. Field ch2 of word M1 is not used for the installation 1. Word M2 comprises a 12-bit field for the identification number NI of the callee terminal that transmitted the call packet PA; this terminal is referred to later as the source. Word M3 comprises a 12-bit field designed to contain the identification number NI of the addressed terminal; this terminal is referred to later as the destination. Likewise, the word M4 comprises a 12-bit field designed to contain a terminal identification number NI. Word M5 comprises first, second and third fields ch1, ch2 and ch3, respectively having 4, 7 and 7 bits. The first and third fields ch1 and ch2 are not used for the installation 1. The second field ch2 indicates a distance D covered by packet PA from the source to destination.

The content of field ch1 of word M1 indicates at all times the "distance" covered by a call packet PA in the chain, in relation to the switching node to which the source that transmitted the call packet PA is connected. More exactly, this content at all times indicates the number of nodes crossed, counted from the source node; the number of nodes is designated hereafter by the term "distance". For this purpose, the distance D, set initially to zero, contained in field cl1 of word M1 is incremented by 1 whenever a switching node is crossed during transmission of the packet in the chain, so that once call packet PA has reached its destination, field ch1 of word M1 contains the distance D between the source and destination of call packet PA.

The call phase begins by the transmission of call packet PA1 by the caller terminal Tdr. Call packet PA1 should be disseminated to all the terminals.

The purpose of the packet PA1 is to inform the callee terminal Tde of a call and simultaneously to determine the distance D(dr-de) from terminal Tdr to terminal Tde. This distance D(dr-de) is used to route data packets PD from terminal Tdr to terminal Tde. On transmission of packet PA1 by terminal Tdr, bit BPA is set to state "1" and the direction bit BS is, for example, set to state "0". The words M1 and M2 respectively contain the identification number NIdr of the caller terminal Tdr and the identification number NIde of the callee terminal Tde. The call packet PA1 is firstly received by (FIG. 1). Node $N_p$ in an internal register at node $N_p$, the identification number NIdr of terminal Tdr, is stored. At node the distance D contained in field ch1 of the word M1, is incremented by 1. At node $N_p$ packet PA1 is transmitted in the chain in the direction BS="0", to the node $N_{(p+1)}$. At node $N_{(p+1)}$ packet PA1 is received the distance D contained in the word M1 is incremented by 1 and packet PA1 is transmitted to the terminal connected to it and to node $N_{(p+2)}$ still in the direction BS="0". At node $N_{(p+2)}$ and the following nodes in the chain to which packet PA1 is successively transmitted, the same operations are performed as at node $N_{(p+1)}$, so that packet PA1 is progressively disseminated to all the terminals and the distance D contained in field ch1 of word M1 is incremented progressively as packet PA1 covers the chain. When packet PA1 has completed a round of the chain and is again received by node $N_p$, the latter identifies it from the number NIdr stored in memory indicating that packet PA1 has covered the entire chain. Packet PA1 has then been disseminated to all the terminals and node $N_p$ eliminates it by not transmitting it to node $N_{(p+1)}$. On receiving packet PA1 terminal connected to node $N_q$ identifies itself, from the number NIde contained in word M3, as being the callee terminal Tde. The packet PA1 received contains the distance D(dr-de) in the field ch1 and word M1. Assuming for example that node $N_q$ is node $N_{p+4}$, the distance D(dr-de) is equal to "0000101"=q−p+1=5. In reply to packet PA1 being received, the terminal Tde transmits the call packet PA2.

The purpose of call packet PA2 is to determine the distance D(de-dr) from terminal Tde to terminal Tdr and to transmit the distance D(dr-de)=5 to terminal Tdr. Call packet PA2 comprise a bit BPA to state "1" and a direction bit BS, for example to state "0". On transmission of packet PA2 by terminal Tde, words M2 and M3 contain respectively the identification numbers NIde and NIdr. The distance D contained in field ch1 of word M1 is initialized to zero; it will be incremented progressively with the transmission of packet PA2 in the chain. Field ch2 of word M5 contains the distance D(dr-de)=5 to be transmitted to the caller terminal Tdr. Packet PA2 is transmitted in the chain by node $N_q$. Node $N_q$ stores in memory the number NIde of terminal Tde contained in word M2. Like packet PA1, packet PA2 covers the whole chain and is disseminated to all the terminals. Terminal Tdr reads its identification number Nidr contained in word M3 of received packet PA3 and identifies itself as being the destination of packet PA2. Fields ch1 and ch2 respectively including words M1 and M5 are then read. Field ch2 of word M5 contains the distance D(dr-de)=5. The distance D(dr-de)=5 is stored in memory by terminal Tdr. Field ch1 of word M5 contains the distance D(de-dr)=I-(q- p)+1="1111101"=125. The distance D(de-dr)=125 is to be transmitted to terminal Tde.

The sole object of call packet PA3 is to transmit the distance D(de-dr)=125 to terminal Tde. Packet PA3 is transmitted by terminal Tdr in the same way as packet PA1 and is disseminated to all the terminals. Field ch2 of word M5 of packet PA3 contains the distance D(de-dr)=125 to be transmitted to terminal Tde. Call packet PA3 can, if required, be replaced by a data packet PD comprising a label field containing the distance D(dr-de)=5 and an information field containing the distance D(de-dr)=125 to be transmitted.

Figure 3:
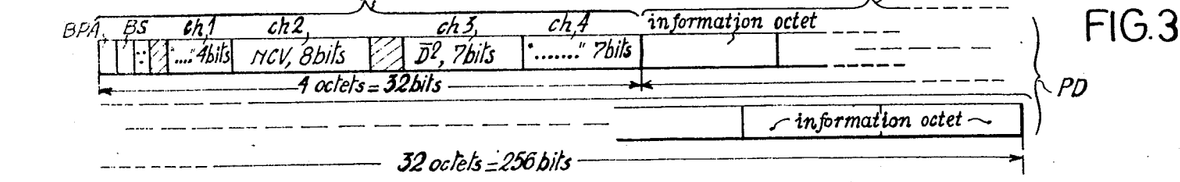

The structure of a data packet PD is shown in FIG. 3. This structure, like the structure of a call packet shown in FIG. 2, is provided as an example.

Referring to FIG. 3, a data packet PD comprises a 4-octet label field and a 32-octet information field. The label field comprises signalling bits BPA and BS, an empty slot for a third signalling bit, and four sub-fields ch1, ch2, ch3 and ch4. Sub-fields ch1 and ch2 are similar to fields ch1 and ch2 of word M0 of a call packet PA; they are respectively 4 bits and 8 bits long. Sub-field ch1 is not used for installation 1. Sub-field ch2 is designed to contain a virtual circuit number NCV. Sub-fields ch3 and ch4 correspond to field ch1 and ch2 of word M1 of a call packet PA. Field ch3 contains the distance D determined during the call phase but as a negative value represented as a 2's complement, noted $\overline{D}^2$. Field ch4 is not used.

In a data packet PD bit BPA has a state "0" and direction bit BS preserves the same state throughout the whole communication as during the call phase, i.e. here BS="0".

To transmit a data packet PD to terminal Tde, terminal Tdr sets bits BPA and BS and includes in sub-field ch3 of packet PD the distance $\overline{D(dr-de)}^2$="1111011" equal to the distance D(dr-de)="0000101" complemented to 2. Packet PD is transmitted by terminal Tdr to node $N_p$ which increments by 1 the distance $\overline{D(dr-de)}^2$ and transmits packet PD to node $N_{(p+1)}$. Node $N_{(p+1)}$ does the same and transmits packet PD to node $N_{(p+2)}$ which transmits it to node $N_{(p+3)}$ and so on. Packet PD is transmitted in the chain from node to node and the distance $\overline{D(dr-de)}^2$ is incremented as 1 by each node is crossed. When packet PD reaches node $N_q=N_{(p+4)}$, after incrementation by node $N_q$, the distance $\overline{D(dr-de)}^2$ has a value "0000000", and node $N_q$ detects that packet PD is intended for it and that packet PD must be switched to terminal Tde. A data packet PD from terminal Tde to terminal Tdr is transmitted in the same way. The distance $\overline{D(de-dr)}^2$="0000011" included in the ch3 label sub-field of packet PD is incremented at each node crossing. When the packet reaches the destination node $N_p$, after incrementation by node $N_p$, the distance $\overline{D(de-dr)}^2$ has a value "0000000". On detecting this value $\overline{D(de-dr)}^2$="0000000", node $N_p$ switches the packet PD to terminal Tdr.

In the case of a communication through the public network, between a first terminal connected to installation 1 and a second terminal in another subscriber installation also connected to the public network, the call packet PA and data packet PD exchanged between the first terminal and the access interface 2 comprise a virtual circuit number NCV, if the public network is of the synchronous time-division switching type. The number NCV is a label and indicates the virtual circuit which the packets transmitted from the first to the second terminal should take in the public network. The number NCV is initially conveyed by the packets transmitted by the public network to the first terminal. Number NCV is recovered by interface 2 which includes it in all the call PA and data PD packets transmitted to the first terminal. The first terminal recovers the number NCV in the packets received and includes it also in all the call packets PA and data packets PD which it transmits in turn and which are conveyed to the second terminal through interface 2 and via the virtual circuit with number NCV in the public network.

Figure 4:
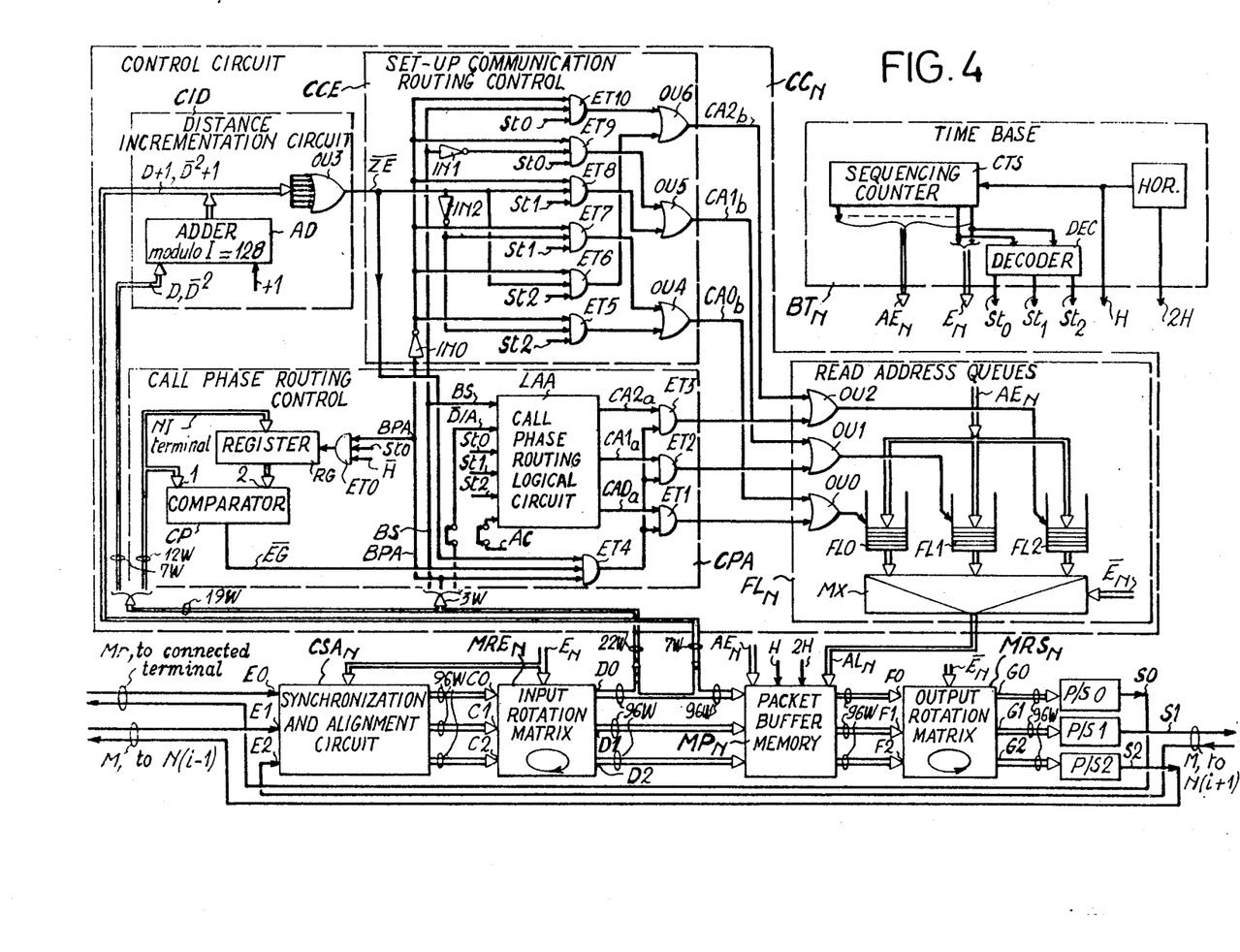
FIG. 4 is a detailed block diagram of a switching node forming a basic switching element in of the network of in FIG. 1 and chain sub-networks included in a second preferred embodiment shown in FIG. 6.

Referring to FIG. 4, a switching node $N_i$, where i is an index in the range between 0 and I-1=127, is preferably formed by a paragonal conversion type switch such as disclosed in U.S. Pat. No. 4,603,416 and U.S. patent application Ser. No. 223,692, filed Jul. 22, 1988 and not yet issued. The packet switch comprises rotation matrixes in order to perform a parallel-to-diagonal conversion, so-called "paragonal conversion" on the incoming packets and a reverse conversion, diagonal-to-parallel, on the outgoing packets. These latter conversions are illustrated in FIGS. 5 to 7 of U.S. Pat. No. 4,603,416. Node $N_i$ basically comprises a time base $BT_N$, a synchronization and alignment circuit $CSA_N$, an input rotation matrix $MRE_N$, a packet buffer memory $MP_N$, an output rotation matrix $MRS_N$, and a control circuit $CC_N$.

The time base $BT_N$ comprises a clock HOR, a sequencing counter CTS, and a decoder DEC. Clock HOR delivers a byte rhythm clock H and a clock 2H whose frequency is double that of clock H. Clocks H and 2H are supplied to buffer memory $MP_N$ and control the packet write and read sequencing in buffer memory $MP_N$.

Sequencing counter CTS receives clock H and delivers packet write addresses $AE_N$ cyclically to buffer memory $MP_N$ and to the inputs of 3 read address queues FL0, FL1 and FL2 included in control circuit $CC_N$. Two least significant outputs of counter CTS are connected to a selection bus of two-wire multiplex way $E_N$. Bus $E_N$ conveys cyclically three multiplex way address 00, 01 and 10 supplied by counter CTS and determines the time intervals attributed respectively to 3 input multiplex ways E0, E1 and E2 and three output multiplex ways S0, S1 and S1. Multiplex way pairs E0 and S0, E1 and S2, and S1 and E2 respectively form the bidirectional multiplex connection way Mr linking node $N_i$ to the terminal connected, bidirectional multiplex way M linking node $N_i$ to node $N_{(i-1)}$ and bidirectional multiplex way M linking mode $N_i$ to node $N_{(i+1)}$.

Bus $E_N$ is connected to the inputs of decoder DEC, to the control inputs of the synchronization and alignment circuit $CSA_N$ and to the inputs controlling the rotation of input rotation matrix $MRE_N$. Decoder DEC causes three outputs signals thereof (St0, St1, St2) to be set to state "1". Signals St0, St1 and St2 are respectively set to 1 when decoder DEC detects the addresses of multiplex ways 00, 01 and 10 on its inputs. A bus $\overline{E}_N$ conveys cyclically the multiplex way addresses 10, 01 and 00 in a reverse order to that of bus $E_N$. Bus $\overline{E}_N$ is connected to the control inputs of a multiplexer MX included in control circuit $CC_N$, and to the rotation control inputs of output rotation matrix $MRS_N$.

The functions of circuit $CSA_N$ are too: receive the incoming packets carried by multiplex ways E0, E1 and E2, recover the synchronization, align the packets and transmit each of the packets in a form of three consecutive groups each having 96 parallel bits to the input rotation matrix $MRE_N$, under the control of multiplex way addresses 00, 01 and 10 delivered by bus $E_N$. Three groups of 96 bits from the input multiplex ways E0, E1, and E2 are respectively transmitted during time intervals t0, t1 and t2 by circuit $CSA_N$ to 3 input ports C0, C1 and C2 of the input rotation matrix $MRE_N$.

Input rotation matrix $MRE_N$ performs a cycle of 0 to 2 circular permutations and delivers the packets in sequential diagonal form via 3 output ports D0, D1 and D2 to 96 parallel outputs each. The three 96 parallel-bit groups in a packet are respectively and successively provided by the ports D0, D1 and D2 according to the known parallel-to-diagonal coversion. The first 5 words of 18 bits of a call packet are delivered in full by the first 90 outputs of port D0 in a single time interval, the information supplied by the last 6 outputs of port D0 and by ports D1 and D2 being routed normally. A data packet PD composed of 36 octets=96×3 bits is supplied in diagonal by ports D0 to D2. Assuming that packet PD originates from input multiplex way E0, a first group of bits of packet PD is supplied by port D0 during time interval t0, a second group of bits is supplied by port D1 during time interval t1, and a third and last group of bits of packet PD is supplied by port D2 during time interval t2.

In the case of an incoming call packet PA, bits BPA and BS (present on the first two outputs of port D0 and the identification number NI of the source present on the thirty-seventh to forty-eighth outputs of port D0), are supplied to control circuit $CC_N$ and to the inputs of a first corresponding port of buffer memory $MP_N$. The distance D, $\overline{D}^2$ present on the nineteenth to twenty-fifth outputs of port D0 which is to be incremented, is supplied solely to circuit $CC_N$. A third output of port D0 not valid for installation 1 is however connected to circuit $CC_N$. This third output supplies a third signalling bit $\overline{D}/A$ for the second preferred embodiment of the invention described later. All the remaining outputs of port D0 are connected to the corresponding inputs of the first input port of buffer memory $MP_N$. Control circuit $CC_N$ delivers an incremented distance D+1, $\overline{D}^2+1$ in reply to the distance D, $\overline{D}^2$ supplied. This incremented distance D+1, $\overline{D}^2+1$, is delivered to the corresponding inputs of the first input port of buffer memory $MP_N$ to be included in the corresponding distance field of the incoming packet that was being written in buffer memory $MP_N$. Ports D1 and D2 of matrix $MRE_N$ are connected respectively to the second and third input ports of buffer memory $MP_N$.

Buffer memory $MP_N$ comprises 3 buffer sub-memories composed of 96-memory memory cells and a read addressing circuit (not shown). The 3 groups of bits of a packet are stored in memory in diagonal form respectively in the 3 buffer sub-memories. The first group is stored in a cell having address $AE_N$ in the first buffer sub-memory; the second group is stored in a cell having address $AE_N+1$ in the second buffer sub-memory and the third group in a cell having address $AE_N+2$ in the third buffer sub-memory. The task of the read addressing circuit is to produce, from a read address $AL_N$ delivered by control circuit $CC_N$, addresses $AL_N+1$ and $AL_N+2$. Addresses $AL_N$, $AL_N+1$, and $AL_N+2$ are applied respectively to the address inputs of the first, second and third buffer sub-memories to read an outgoing packet to be transmitted to the output rotation matrix $MRS_N$.

Matrix $MRS_N$ performs a cycle of 2 to 0 circular permutations. These circular permutations are made in a direction opposite to those made by input rotation matrix $MRE_N$, so as to produce a reverse paragonal conversion, i.e., a diagonal-to-parallel conversion, and deliver outgoing packets in parallel form. The outgoing packets in diagonal form are supplied by 3 output ports of buffer memory $MP_N$ respectively to 3 input ports F0, F1 and F2 of matrix $MRS_N$. Three output ports G0, G1 and G2 respectively transmit, by groups of 96 bits, the outgoing packets to 3 output multiplexes S0, S1 and S2. Parallel/serial converters P/S0, P/S1 and P/S2 are inserted respectively between ports G0, G1 and G2 and the output multiplexes S0, S1 and S2 so as to serialize the bits of the outgoing packets.

Control circuit $CC_N$ comprises a read address queue circuit $FL_N$, a distance incrementation circuit CID, a call phase routing control circuit CPA, and a set-up communication routing control circuit CCE.

The read address queues circuit $FL_N$ comprises 3 queues FL0 to FL2 of FIFO type, three 3-input OR gates OU0, OU1 and OU2 and the multiplexer MX.

Queues F0 to F2 are respectively associated with output multiplex ways S0 to S2. Each of the queues stores, in chronological order of arrival of the packets, the addresses in buffer memory $MP_N$ of the cells where the packets to be transmitted to the associated output multiplex way are stored. The addresses $AE_N$, delivered by time base $BT_N$, are received at the input of all the queues. Through gates OU0 to OU2, queues FL0 to FL2 receive respectively routing control signals $CA0_a$ to $CA2_a$ delivered by circuit CPA during the call phase, and routing control signals $CA0_b$ to $CA2_b$ delivered by circuit CCE during the communication phase. A routing control signal at state "1" controls the loading in the corresponding queue of address $AE_N$ applied to its data inputs. The outputs of the 3 queues FL0 to FL2 are connected respectively to 3 input ports of multiplexer MX. Multiplexer MX delivers the multiplexed read addresses $AL_N$ to buffer memory $MP_N$.

The distance incrementation circuit CID comprises a modulo I=128 adder, AD, and a 7-input OR gate OU3. Adder AD receives on its first parallel inputs the distance D, $\overline{D}^2$ supplied by port D0 of matrix $MRE_N$ and on a second input the +1 increment to be added to distance D, $\overline{D}^2$. Adder AD delivers on output the incremented distance D+1, $\overline{D}^2+1$. This distance is supplied to the inputs of gate OU3 and to the first input port of buffer memory $MP_N$. Gate OU3 detects when the incremented distance D+1, $D^2+1$ is equal to value "0000000". Gate OU3 delivers a signal $\overline{ZE}$ which takes on active state "0". Signal $\overline{ZE}$ is supplied to the call phase routing control circuit CPA and to the set-up communication routing control circuit CCE.

The call phase routing control circuit CPA comprises a register RG, a word comparator CP, a 3-input AND gate ET0, a call phase routing logical circuit LAA, three 2-input AND gates ET1, ET2 and ET3, and a 3-input AND gate ET4.

Register RG, comparator CP and gate ET0 are means for storing the identification number NI of the connected terminal when it that is transmitting a call packet PA and for comparing this number NI to the identification number of each incoming call packet so as to detect whether the incoming call packet is a packet transmitted by the connected terminal that has completed a tour of the chain; in which case the incoming call packet must be eliminated.

Register RG receives on parallel inputs the number NI of the source included in the incoming call packet PA. The number NI is also applied to the first parallel outputs of comparator CP. Parallel inputs of the register RG to which the number NI stored in memory is supplied are connected to second inputs of comparator CP. The function of gate ET0 is to control the storage of number NI in register RG when the incoming call packet comes directly from the connected terminal to be transmitted in the chain. Gate ET0 receives on first, second and third inputs respectively bit BPA, signal St0 and a complementary byte rhythm signal H the gate has an output on which is derived a loading control supplied to register RG. Bit BPA and signal St0 are set to state "1" to indicate that the incoming packet is a call packet PA coming from multiplex way E0 connected to the terminal. Signal $\overline{H}$ synchronizes the loading control delivered by gate ET0. When a call packet PA transmitted by the terminal connected to node $N_i$ has completed a tour of the chain and is supplied to node $N_i$ by input multiplex way E1 or E2, this call packet PA is detected by comparator CP which delivers consecutively a signal $\overline{EG}$ having an active state "0". Signal $\overline{EG}$ is applied to a first input of gate ET4.

The function of gate ET4 is to control the closing of gates ET1 to ET3 through which are supplied, via the call phase routing logical circuit LAA, the 3 control signals $CA0_a$ to $CA2_a$ designed for the write address queues FL0 to FL2. Gate ET4 also receives also receives on second and third inputs respectively, bit BPA and signal $\overline{ZE}$ supplied by the distance incrementation circuit CID. Thus, in the case where $\overline{EG}$="0", BPA="0", or $\overline{ZE}$="0", gates ET1 to ET3 are closed and circuit CPA does not deliver control signals $CA0_a$ to $CA2_a$ to queues FL0 to FL2. Call packets PA having completed a tour of the chain, BPA="1" and $\overline{EG}$.-$\overline{ZE}$="0", are eliminated, whereby their respective addresses are not loaded in the queues. When the communication has been set up, bit BPA is set to state "0" and circuit CPA is deactivated by the closing of gates ET1 to ET3 which inhibit control signals $CA0_a$ to $CA2_a$.

Figure 5:
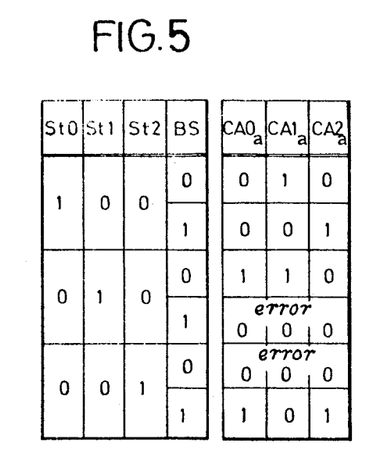
FIG. 5 is a truth table of the operation of a routing logic circuit in call phase, comprised in a switching node of the network in FIG. 1.

The function of the call phase routing logical circuit CPA is to produce the control signals $CA0_a$ to $CA2_a$ as a function of bit BS and signals St0 to St2. Bit $\overline{D}/A$ and a signal AC shown in FIG. 7 are not used for installation 1; the corresponding inputs of circuit LAA are disconnected. The truth table of the logical circuit LAA is shown in FIG. 5. This table indicates the operating of the nodes in a call mode described previously in reference to FIGS. 1 to 3, notably when the incoming packets have direction bits BS with wrong values not corresponding to the input multiplex ways.

The function of the set up communication routing control circuit CCE is to produce a routing control signal $CA0_b$ to $CA2_b$ as a function of bits BPA and BS, signals ZE and St0 to St2. Circuit CCE comprises six 2-input AND gates ET5 to ET10, three 2-input OR gates OU4, OU5 and IN1 and OU6, and 3 logical inverters IN0 to IN2.

Bit BPA is applied through inverter IN0 to first inputs respectively of gates ET5 to ET10. Bit BS is applied directly to a second input of gate ET10 and through the inverter IN1 to a second input of gate ET9. Signal $\overline{ZE}$ is applied directly to second inputs of gates ET6 and ET8 and, through inverter IN2, to the second inputs of gates ET5 and ET7. Signal St0 is applied to third inputs of gates ET9 and ET10, signal St1 to third inputs of gates ET7 and ET8, and signal St2 to third inputs of gates ET5 to ET6. Outputs of gates ET7, ET9 and ET10 are connected respectively to first inputs of gates OU4, OU5 and OU6. Outputs of gates ET5, ET8 and ET6 are connected respectively to second inputs of gates OU4, OU5 and OU6. Gates OU4 to OU6 respectively derive signals $CA0_b$ to $CA2_b$. Signals $CA0_b$ to $CA2_b$ are applied respectively to second inputs of gates OU0 to OU2 in circuit $FL_N$ so as to control the loading of write addresses $AE_N$ in queues FL0 to FL2.

Bit BPA="0" indicates the incoming packets are data packets PD. Bit BPA="0" opens gates ET5 to ET10 thus authorizing the operating of circuit CCE. Gates ET5 and ET6 control the routing of an incoming packet PD from multiplex way E2 and node $N_{(i+1)}$ respectively to multiplex way S0 linked to the terminal if signal $\overline{ZE}$="0", i.e. if $\overline{D}^2+1$="0000000", and to multiplex way S2 linked to node $N_{(i-1)}$ if signal $\overline{ZE}$="1", i.e. if $\overline{D}^2+1\neq$"0000000". Gates ET7 and ET8 control the routing of an incoming packet PD from multiplex way E1 and node $N_{(i-1)}$ respectively to multiplex way S0 if signal $\overline{ZE}$="0" and to multiplex way S1 linked to node $N_{(i+1)}$ if signal $\overline{ZE}$="1". Gates ET9 and ET10 control the routing of an incoming packet PD from multiplex way E0 and the terminal respectively to multiplex way S2 if direction bit BS="1" and to multiplex way S1 if direction bit BS="0".

Figure 6:
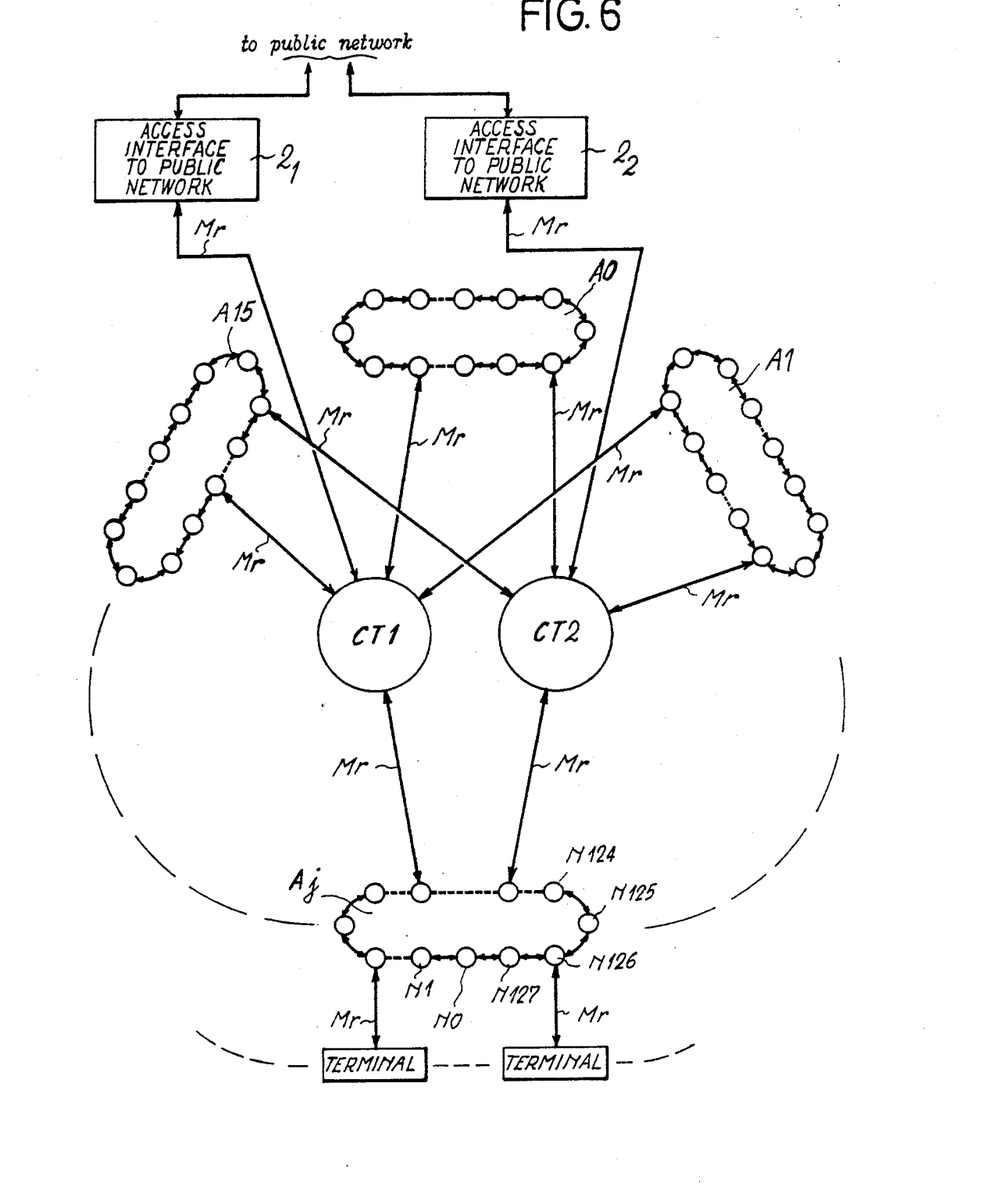
FIG. 6 is a block diagram of a second preferred embodiment of a packet time-division switching network in the form of a local business network with a chain-star structure.

Referring to FIG. 6, the second preferred embodiment of a network basically comprises J=16 chains connecting terminals A0 to A15 and two central switches CT1 and CT2. This second embodiment has a chain-star structure and is more especially designed for a local business network.

Chains A0 to A15 are similar to the chain forming the installation 1 shown in FIG. 1; each comprises a maximum of 128 switching nodes N0 to N127. In any chain Aj(were j is an integer index between 0 and J−1=15), any two nodes of the chain are linked respectively to central switches CT1 and CT2. The remaining nodes are linked to terminals. One or several access interfaces to the public network, such as interface 2 shown in FIG. 1, can be provided to link the local network to the public network. Two interfaces $2_1$ and $2_2$ respectively linked to central switches CT1 and CT2 are shown in FIG. 6.

Central switches CT1 and CT2 are similar and operate on a load sharing basis. According to another embodiment for lower traffic, the network comprises one single central switch instead of two.

As with installation 1, prior to the setting up of a communication between a caller terminal Tdr and callee terminal Tde, three call packets PA1, PA2 and PA3 are exchanged between these terminals so as to determine and communicate to each other the distances required to transmit data packets PD.

Figure 7:
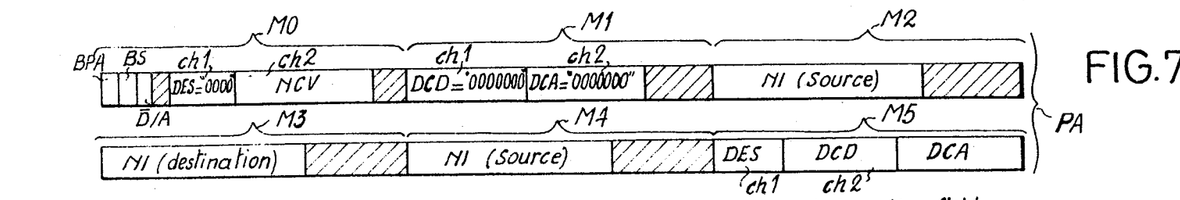
FIGS. 7 and 8 are respectively, formal diagrams of call packets and data packets transmitted in the local business network shown in FIG. 6.

As shown in FIG. 7, a call packet PA in this second embodiment comprises a third signalling bit $\overline{D}/A$ included in word M0 in addition to bits BPA and BS. Bit $\overline{D}/A$ is used to separate into two categories the call packet PA covering a chain Aj. The call packets PA having bit $\overline{D}/A$ set to state "0" are transmitted in chain Aj by sources connected to the chain. These packets PA, $\overline{D}/A$="0", should in the first place be routed to switches CT1 and CT2 which will set their respective bits $\overline{D}/A$ to state "1" and disseminate these packets PA, $\overline{D}/A$="1", to all the chains including chain Aj. In chain Aj, the packets PA, $\overline{D}/A$="1", are disseminated to all the terminals connected and are eliminated after having covered a tour of the chain. Field ch1 of word M0 is designed to contain a distance DES of 4 bits representing the switching performed by a central switch. Fields ch1 and ch2 of word M1 are designed to contain respectively distances DCD and DCA of 7 bits each. Distances DES, DCD and DCA are initialized to zero on transmission of packet PA by the source. Distance DCD represents, in a departure chain to which the source is connected, the distance between the node linked to the source and the node linked to the central switch to which packet PA is switched. Distance DCA represents, in an arrival chain to which the destination is connected, the distance between the node linked to the central switch through which packet PA is transmitted in the chain and the node linked to the destination. Word M4 contains the identification number NI of the source, in the same way as word M2. Fields ch1, ch2 and ch3 are designed respectively to contain the distances DEC, DCD and DCA determined by the previous call packet.

Figure 8:
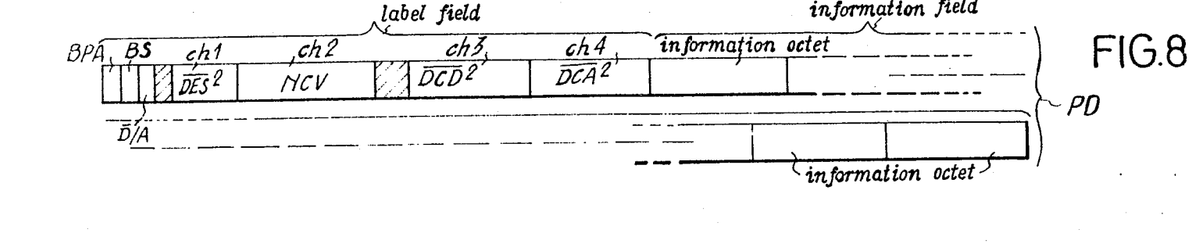

As shown in FIG. 8, on its transmission by the source, a data packet PD contains, in its label field, distances $\overline{DES}^2$, $\overline{DCD}^2$ and $\overline{DCA}^2$ corresponding to distances DES, DCD and DCA complemented to 2.

Figure 9:
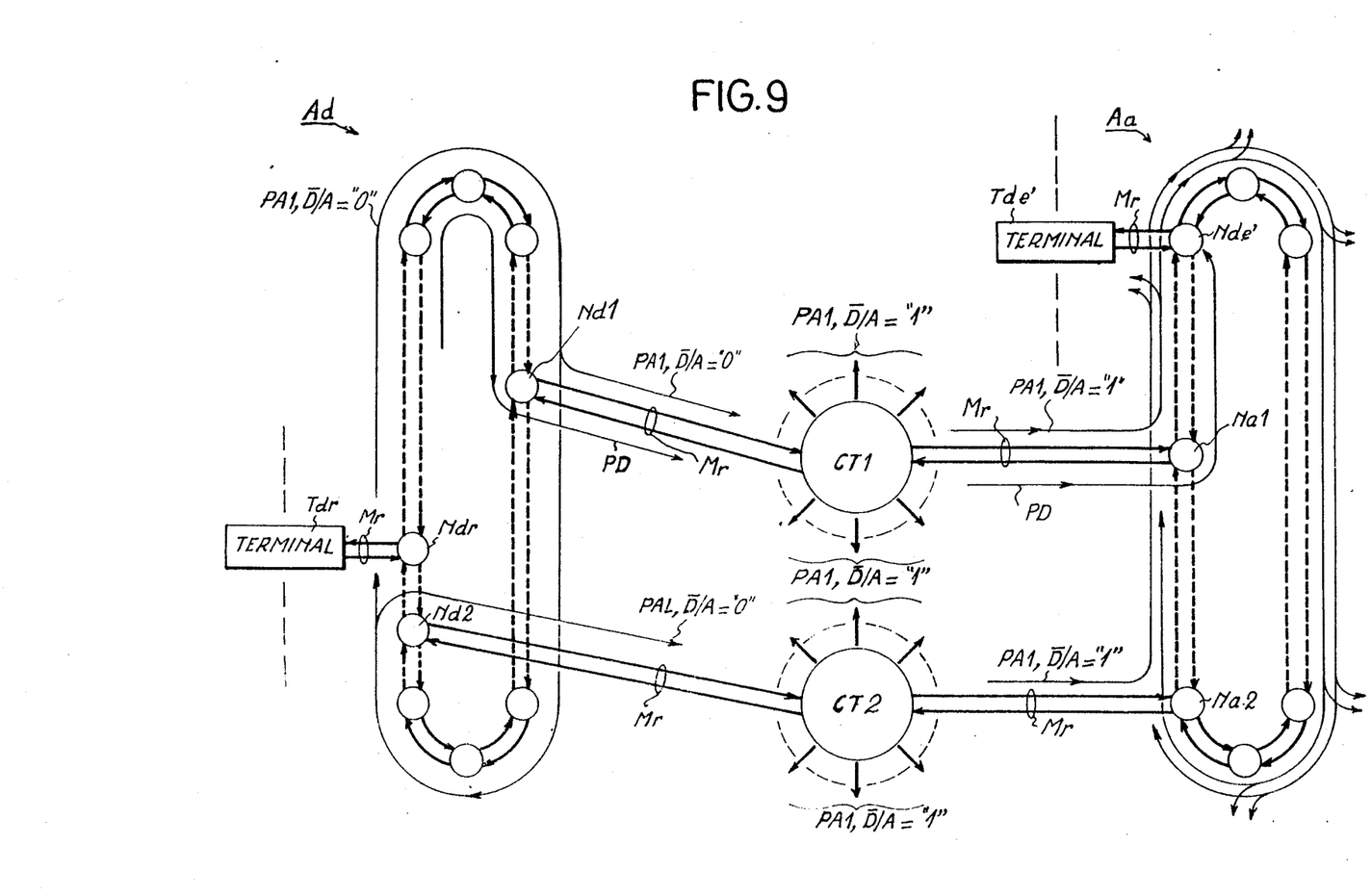
FIG. 9 is a diagram of different routes followed by a call packet transmitted by a caller terminal and disseminated in the local business network to all the other terminals connected.

FIG. 9 shows, for example, routes covered by a first call packet PA1 and a data packet PD transmitted by a caller terminal Tdr connected to a departure chain Ad to a callee terminal Tde connected to an arrival chain Aa.

Call packet PA1 with bit $\overline{D/A}$="0" is transmitted in chain Ad by node Ndr linked to terminal Tdr. Packet PA1 covers the chain and the distance DCD initially set to zero and incremented by as 1 by each node is crossed. Packet PA1 is not disseminated at this stage to the other terminals connected to the chain. Packet PA1 is transmitted to switches CT1 and CT2 by nodes Nd1 and Nd2 respectively linked to these switches. When packet PA1 returns to node Ndr after having made a tour of the chain Ad, it is eliminated by node Ndr which recognizes its identification number NI stored in memory on transmission of the packet PA1 in chain Ad and which also detects the distance DCD="0000000" after a tour of the chain, in the case where the chain contains 128 nodes. Switches CT1 and CT2 set bit $\overline{D/A}$ to state "1", invert the contents of distance fields ch1 and ch2 of word M1, i.e. distances DCD and DCA, replace the source number NI in word M2 by an identification number NI attributed to the switch and disseminate the packet to PA1, D/A="1", to all the chains A0 to A127. Each of the packets disseminated to PA1, D/A="1", by a central switch, contains a respective distance DES included in the packet by the switch.

Two call packets PA1, $\overline{D/A}$="1", transmitted respectively by switches CT1 and CT2 are received by nodes Na1 and Na2 of chain Aa linked respectively to these switches. Nodes Na1 and Na2 store in memory respectively the identification numbers NI of the switches contained in the packets received. Nodes Na1 and Na2 then transmit the 2 packets PA1 in chain Aa. The two packets PA1 cover chain Aa and are disseminated to all the terminals connected. On each crossing of a node by a packet PA1, the distance DCA initially set to zero and now contained in field ch1 of word M1 is incremented by 1. The called terminal Tde identifies a call packet PA1 which is designed for it from the destination number NI contained in word M3 of the packet. When the call packets PA1 transmitted in chain Aa by nodes Na1 and Na2 return after a tour of the chain to nodes Na1 and Na2, they are identified from the numbers NI of switches CT1 and CT2, contained in word M2 and also stored in memory by nodes Na1 and Na2. Distance DCA="0000000" contained in call packet PA1 after a tour of the chain, in the case where the chain comprises 128 nodes, is also detected by nodes Na1, and Na2. The two call packets PA1 transmitted in chain Aa by nodes Na1 and Na2 having each completed a tour of the chain are eliminated respectively by nodes Na1 and Na2. Only one of the two call packets PA1 is retained by terminal Tde. A criterion such as a sum of minimum distances DCD+DCA corresponding to a minimum transit time can, for example, be used by terminal Tde to determine the packet to be retained. Call packets PA2 and PA3 are then transmitted between terminals Tdr and Tde in a similar way to the transmission of packet PA1 and at the end of the call phase, terminals Tdr and Tde have at their disposal the different distances DES, DCD and DCA required to transmit data packets PD.

Let us consider for example, as shown in FIG. 9, that the route via switch CT1 is the one adopted to transmit packets PD from terminal Tdr to terminal Tde. A packet PD transmitted by terminal Tdr covers the departure chain Ad. The distance $\overline{DCD}^2$ contained in packet PD is incremented as 1 by each node is crossed. After incrementation by node Nd1, this distance $\overline{DCD}^2$ takes on value "0000000" and packet PD is transmitted to switch CT1. Also, the contents of the distance sub-fields ch3 and ch4 of the label field of packet PD, initially containing distances $\overline{DCD}^2$ and $\overline{DCA}^2$ are inverted and distance $\overline{DES}^2$ is used by switch CT1 to control the switching of packet PD to an output multiplex way linked to the node Na1 of the arrival chain Aa. Packet PD is transmitted in chain Aa by node Na1. Distance $\overline{DCA}^2$ contained in sub-field ch3 is incremented by 1 by as each is crossed. After incrementation by node Nde, this distance $\overline{DCA}^2$ takes on value "0000000" and packet PD is switched to terminal Tde. A packet PD is transmitted from terminal Tde to terminal Tdr in a similar way.

Figure 10:
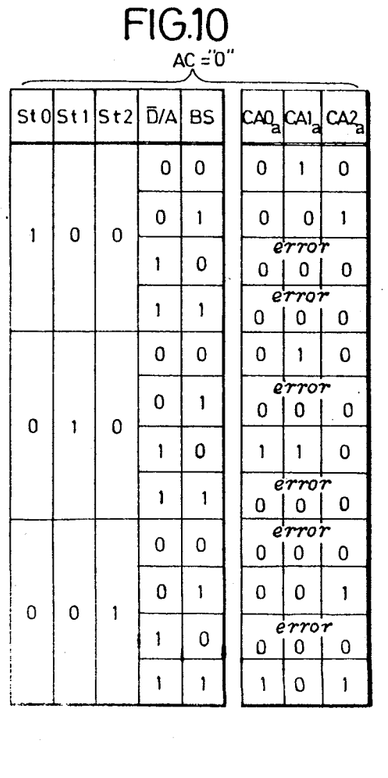
FIGS. 10 and 11 are respectively two truth tables showing the operation of first and second routing logic circuits, in call phase, included in first and second switching nodes of the local business network, wherein the first node is not connected to a central switch in the local network and the second node is connected to a central switch in the local network.
Figure 11:
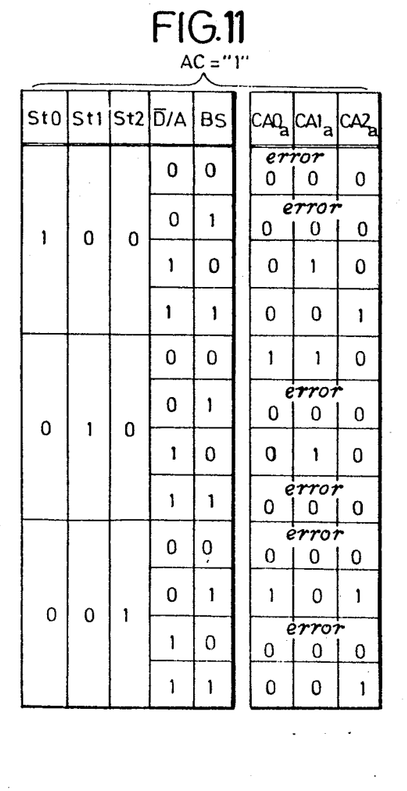

Referring again to FIG. 4, in the switching nodes included in this second embodiment, $\overline{D/A}$ and signal AC are applied as inputs of the call phase routing logical circuit LAA, along with bit BS and signals St0 to St2. The nodes linked to central switches CT1, CT2 differ from the nodes linked to the terminals through their call phase operation. In a node linked to a terminal or to an interface, signal AC is set to state "0" and circuit LAA then has a truth table shown in FIG. 10. This truth table indicates the states of routing control signals $CA0_a$ to $CA2_a$ for all the possible input signal combinations. In a node linked to a central switch CT1, CT2, signal AC is set to state "0" and circuit LAA then has a different truth table, as shown in FIG. 11. The truth tables shown in FIGS. 10 and 11 specify the operation of the switching nodes in the call phase described previously in reference to FIG. 9.

Figure 12:
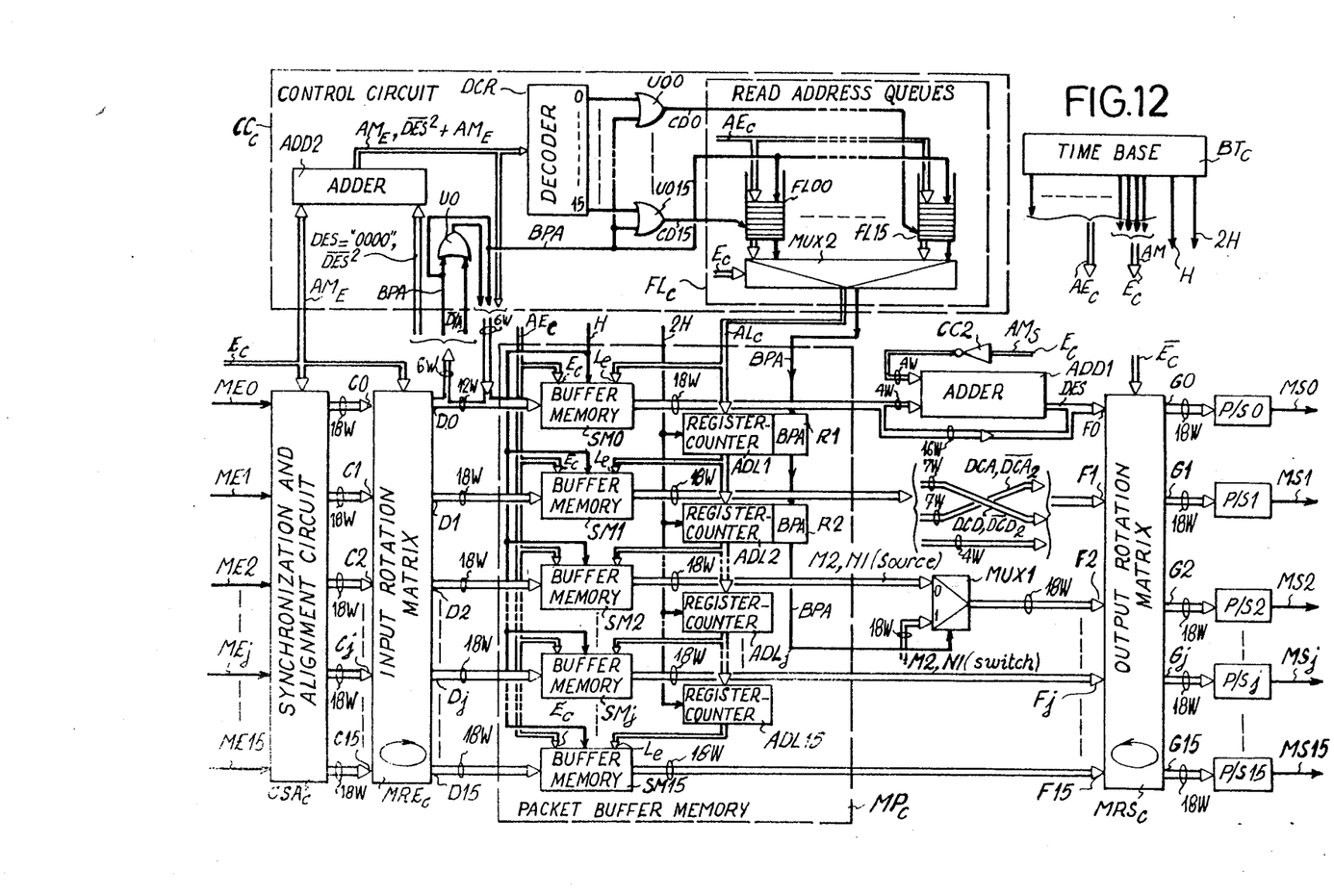
FIG. 12 is a detailed block diagram of two central switches included in the local business network.

Referring to FIG. 12, a central switch CT1, CT2, like switching node $N_i$ shown in FIG. 4, preferably consists of a paragonal conversion type switch as defined in U.S. Pat. No. 4,603,416. The switch basically comprises a time base $BT_C$, a synchronization and alignment circuit $CSA_C$, an input rotation matrix $MRE_C$, a packet buffer memory $MP_C$ and an output rotation matrix $MRS_C$, a control circuit $CC_C$, an adder ADD1 and a multiplexer MUX1.

Time base $BT_C$ produces H and 2H rhythm signals, packet write addresses $AE_C$ and J=16 multiplex way addresses AM="0000" to "1111" supplied by a sequencing bus E.

J=16 input multiplex ways ME0 to ME15 carrying packets respectively from the J=16 chains A0 to A15 are connected to the synchronization and alignment circuit $CSA_C$. Circuit $CSA_C$ delivers packets in groups of 18 bits in J=16 output bus connected respectively to J=16 input ports C0 to C15 of input rotation matrix $MRE_C$. Circuit $CSA_C$ and matrix $MRE_C$ have control inputs linked to sequencing bus $E_C$ and receive multiplex way addresses AM="0000" to "1111" respectively selecting the J=16 input multiplex ways ME0 to ME15 and J=16 output multiplex ways MS0 to MS15.

The input rotation matrix $MRE_C$ makes a cycle of 0 to J−1=15 circular permutations on the groups of 18 bits of incoming packets and delivers, in diagonal form, the incoming packets by J=16 ports of 18 outputs each, D0 to D15. The significant bits of call packets PA consisting of 6 words M0 to M5 of 18 bits each, are delivered by output ports D0 to D5. Data packets PD each consisting of J=16 groups of 18 bits, i.e. 288 bits, are delivered by output ports D0 to D15. Bits BPA, $\overline{D}/A$ and distance DES or $\overline{DES}^2$ delivered by corresponding outputs of port D0 are supplied to control circuit $CC_C$. The remaining outputs of port D0 are linked to corresponding data inputs of a buffer sub-memory SM0 of packet buffer memory $MP_C$. Ports D1 to D15 are respectively linked to input ports of buffer sub-memories SM1 to SM15 of buffer memory $MP_C$.

Buffer memory $MP_C$ comprises the J=16 buffer sub-memories SM0 to SM15 and a read addressing circuit consisting of J−1=15 cascade-connected registers-counters ADL1 to ADL15 cascade-connected.

Each of the buffer sub-memories SM0 to SM15 receives a signal H on a clock input and addresses $AE_C$ supplied by time base $BT_C$ to write address inputs $E_C$. Read address inputs Le of buffer sub-memory SM0 receive read addresses $AL_C$ delivered by a read address queues circuit $FL_C$ included in control circuit $CC_C$. Addresses $AL_C$ are also supplied on the data inputs of register-counter ADL1. Registers-counters ADL1 to ADL15 each receive signal 2H on respective control inputs. Registers-counters ADL1 to ADL15 diagonally deliver addresses $AL_C+1$ to $AL_C+15$ which are supplied respectively to the inputs Le of sub-memories SM1 to SM15. Addresses $AL_C$ to $AL_C+15$ read address memory cells of sub-memories SM0 to SM15 where the packets to be transmitted to the J=16 output multiplexes MS0 to MS15, respectively linked to chains A0 to A15, are stored diagonally in memory.

Registers-counters ADL1 to ADL2 comprise respectively cascade-connected 1-bit registers R1 and R2. Each of registers R1 and R2 stores bit BPA of the outgoing packet of buffer memory $MP_C$. The contents of registers R1 and R2, i.e. bit BPA, are not incremented under the control of signal 2H, as are addresses $AL_C$ and $AL_C+1$ to produce respectively addresses $AL_C+1$ and $AL_C+2$. Bit BPA and address $AL_C+1$ are delivered in parallel by register-counter ADL2. Bit BPA supplied by register-counter ADL2 is applied to a control input of multiplexer MUX1.

Multiplexer MUX1 comprises first inputs linked to outputs of buffer sub-memory SM2 and second inputs to which a word M2 (FIG. 7) containing the identification number NI of the switch is applied. When bit BPA="0", the packet being read in buffer memory $MP_C$ is a data packet PD. The first inputs of multiplexer MUX1 are selected by bit BPA="0" and the group of data bits of packet PD delivered by sub-memory SM2 is transmitted via multiplexer MUX1 to an input port F2 of output rotation matrix $MRS_C$. When bit BPA="1", the packet being read is a call packet PA and sub-memory SM2 delivers word M2 containing identification number NI of the source. The second inputs of multiplexer MUX1 are selected by bit BPA="1" and the identification number NI of the switch is transmitted to port F2 of the matrix and replaces the number NI of the source in word M2 of packet PA.

Sub-memory SM1 delivers, at its output, (i) distances DCD and DCA="0000000" in the case of a call packet PA being read, and (ii) distances $\overline{DCD}^2$="0000000" and $\overline{DCA}^2$ in the case of a data packet PD being read. A first group of 7 outputs of sub-memory SM1 delivers the distance DCD or $\overline{DCD}^2$; a second group of 7 outputs of sub-memory SM1 delivers distance DCA or $\overline{DCA}^2$. These first and second groups of outputs of sub-memory SM2 are linked respectively to second and first groups of inputs of a corresponding input port F1 of matrix $MRS_C$ so as to "cross" distances DCD and DCA, or $\overline{DCE}^2$ and $\overline{DCA}^2$, in packet PA or PD being read, in such a way that distance DCD or $\overline{DCD}^2$ occupies the field previously occupied by DCA or $\overline{DCA}^2$ and distance DCA or $\overline{DCA}^2$ occupies the field previously occupied by distance DCD or $\overline{DCD}^2$.

The outputs of sub-memories SM3 to SM15 are linked respectively to input ports F3 to F15 of matrix $MRS_C$. The output of sub-memory SM0 is linked to an input port F0 of matrix $MRS_C$ via adder ADD1 whose function is indicated later.

Output rotation matrix $MRS_C$ makes a reverse paragonal conversion, i.e., a diagonal-to-parallel conversion. Inputs controlling rotation of matrix $MRS_C$ are linked to a sequencing bus $\overline{E}_C$ conveying multiplex addresses AM="1111" to "0000" in a reverse order to bus $E_C$. Matrix $MRS_C$ makes a cycle of 15 to 0 circular permutations. The packets are received in diagonal form on input ports F0 to F15 and are delivered in parallel form by groups of 18 bits by J=16 output ports G0 to G15. The output ports G0 to G15 are connected to input ports of J=16 parallel/serial converters P/S0 to P/S15 associated respectively with J=16 output multiplexes MS0 to MS15.

Control circuit $CC_C$ comprises an adder ADD2, a two-input or gate UO a decoder DCR, J=16 two-input or gates, OU0 to OU15, and a read address queue circuit $FL_C$.

First inputs of adder ADD2 are connected to sequencing bus $E_C$ and receive the address $AM_E$ of the multiplex way from which the incoming packet originates. Second inputs of adder ADD2 are connected to port D0 of matrix $MRE_C$ and receive distance DES="0000000" in the case of an incoming call packet PA and distance $\overline{DES}^2$ in the case of an incoming data packet PD. Adder ADD2 therefore delivers an output address $AM_E$ in the case of an incoming packet PA and value $\overline{DES}^2+AM_E$ in the case of an incoming packet PD. This address $AM_E$ or value $\overline{DES}^2+AM_E$ is supplied on input to decoder DCR, and to the inputs of buffer sub-memory SM0 to be stored in memory parallel to the other bits of packets supplied by port D0 of matrix $MRE_C$, in a field corresponding to distance DES or $\overline{DES}^2$ in a cell of sub-memory SM0.

Gate U0 receives on first and second inputs respectively, bits BPA and $\overline{D}/A$ supplied by port D0 of matrix $MRE_C$ and delivers at its output the bit $\overline{D}/A$ pre-set to state "1" in the case of an incoming packet PA. Bit BPA and bit $\overline{D}/A$ delivered by gate U0 are applied to the input of buffer sub-memory SM0 to be stored in memory parallel to the other packet bits.

Bit BPA is also applied to the first inputs of gates UO0 to UO15. Sixteen outputs 0 to 15 of decoder DCR are linked respectively to the second inputs of gates UO0 to UO15. Decoder DCR receives on input the address $AM_E$ or value $\overline{DES^2} + AM_E$ supplied by adder ADD2. Gates UO0 to UO15 derive routing control signals CD0 to CD15.

The read address queue circuit $FL_C$ comprises J=16 read address queues FL00 to FL15 and a multiplexer MUX2. The inputs of queues FL00 to FL15 receive concurrently write address $AE_C$ and bit BPA. Signals CD0 to CD15 supplied by gates UO0 to UO15 are applied respectively to loading control inputs of the queues FL00 to FL15. Output ports of queues FL00 to FL15 are linked respectively to J=16 corresponding input ports of multiplexer MUX2. Multiplexer MUX2 comprises control inputs connected to bus $E_C$ and receiving multiplex way addresses AM="1111" to "0000". The output of multiplexer MUX2 derives the read address $AL_C$ and bit BPA supplied to the packet buffer memory $MP_C$.

When the incoming packet is a call packet PA, bit BPA="1"(applied to the first inputs of gates UO0 to UO15) pre-sets all the routing control signals CD0 to CD15 to active state "1" and address $AE_C$ is loaded in all the queues FL00 to FL15. The incoming packet PA is, therefore, after being read in memory $MP_C$, transmitted to the J=16 output multiplex ways MS0 to MS15 to be disseminated to the J=16 chains A0 to A15 Each of packets PA has a distance DES representing the difference between the address $AM_E$ of the input multiplex way and the address $AM_S$ of the output multiplex way, this difference being a relative address of the output multiplex way $AM_S$ as compared to the address of the input multiplex way $AM_E$.

In fact, for a packet PA being read, buffer sub-memory SM0 delivers to the first inputs of adder ADD1, address $AM_E$ stored in memory in sub-memory SM0 while packet PA is being written, and on second inputs an output multiplex way address $AM_S$ complemented to 2, i.e. $\overline{AM^2}_S$. A complementation-to-2 circuit, CC2, is provided to complement address $AM_S$ present in bus $\overline{E_C}$. Address ADD1 therefore delivers the distance $DES = AM_E + \overline{AM^2}_S = AM_E - AM_S$. The distance $DES = AM_E - AM_S$ is applied to input port F0 of matrix $MRS_C$.

When the incoming packet is a data packet PD, decoder DCR delivers value $\overline{DES^2} + AM_E = -- (AM_E - AM_S) + AM_E = AM_S$, thus equal to the address of the output multiplex way to which packet PD should be switched. Decoder DCR activates to state "1" a single output corresponding to the value of address $AM_S$. Gates UO0 to UO15 being opened by bit BPA="0", the output state "1" of decoder DCR activates to state "1" the corresponding routing control signal. Also, the write address $AE_C$ of packet PD in buffer memory $MP_C$ is loaded in the read address queue corresponding to the value of address $AM_S$. When packet PD is read from buffer memory $MP_C$, sub-memory SM0 applies the address $\overline{DES^2} + AM_E = AM_S$ to the first inputs of adder ADD1 and the complemented address $\overline{AM^2}_S$ is applied to the second inputs by circuit CC2. Adder ADD1 then delivers a value $AM_S + \overline{AM_S^2} = $ "0000". Sub-field ch1 of packet PD attributed to distance $\overline{DES^2}$ is thus initialized to zero after switching of packet PD by the central switch.

What we claim is:

1. A method of routing packets between first and second bidirectional connection multiplex ways connected to a packet time-division switching network, said network comprising plural packet switches chain-connected to form a bidirectional packet transmission artery, each of said switches connecting to said artery a respective bidirectional connection multiplex way, during a communication set-up phase preliminary to said data packet transmission, activating said first and second connection multiplex ways to transmit in said artery (i) respectively first and second call packets which are disseminated to all said connection multiplex ways so as to measure respectively first and second distances between switches connecting said first and second multiplex ways to said artery, said first and second distances respectively including a number of switches to be crossed by a packet transmitted by said first connection multiplex way to reach said second connection multiplex way and a number of switches to be crossed by a packet transmitted by said second connection multiplex way to reach said first connection multiplex way, and (ii) a call packet including a distance word which is initially set to zero on transmission of said call packet, and incrementing the distance word by 1 as it crosses each switch to provide a measure of said corresponding distance, and during a communication phase, transmitting data packets including distance words representing said first and second measured distances from said first to second connection multiplex ways and vice-versa so as to carry said data packets, decrementing by 1 a distance word included in a data packet transmitted during the communication phase by 1 as said packet is crossing a switch such that the packet reaches a switch to which a connection multiplex way addressee of said packet is connected, said distance word included in said packet has a null value indicating to said switch that said packet is to be switched to said connection multiplex way connected to it.

2. A packet time-division switching network comprising I switches, where I is an integer and said switches are chain-connected to form a bidirectional packet transmission artery, each switch connecting a respective bidirectional connection multiplex way to said artery, wherein one of said switches comprises:

entry means for detecting incoming packets in 3 parallel input multiplex ways, the input multiplex way transmitting the packets synchronously, each incoming packet including a distance word and a signalling bit for indicating a transmission direction of said packet in said artery, said packets including call packets transmitted during a communication set-up phase and data packets transmitted during a data transmission phase of communication, means linked to said entry means for multiplexing said packets transmitted by said entry means;

a buffer memory for temporarily storing said packets;

means for demultiplexing said packets read cyclically in said buffer memory thereby transmitting them to 3 parallel output multiplex ways; and means for processing the distance word included in each incoming packet and for switching said incoming packet as a function of (i) the signalling bit included in said packet, (ii) whether said packet is a call or data packet, and (iii) the value of said distance word, said distance word representing the number of switches to be crossed by said packet to be routed from a transmission source of said packet to a destination to which said packet is addressed.

3. The packet time-division switching network as claimed in claim 2, wherein said multiplexing means comprises means for converting said incoming packets into diagonal packets, the incoming packets including each of successive series groups of parallel bits, each of the diagonal packets being arranged so said parallel bit groups are sequentially derived in a sequential diagonal configuration, said demultiplexing means comprising means for converting said diagonal packets read into said packets transmitted to said output multiplex ways.

4. The packet time-division switching network as claimed in claim 2, wherein a switch included in said processing and switching means comprises:
means for detecting call packets and data packets in said incoming packets:
means for (i) storing an identification number included in each call packet transmitted in said artery by a connection multiplex way connected to said switch, (ii) comparing said identification number with a source identification number included in each incoming call packet crossing through said artery thereby detecting whether an incoming call packet has made a tour of said artery, and (iii) eliminating the incoming call packet if it has made a tour of said artery;
means for incrementing by 1 said distance word included in an incoming call packet;
first control means responsive to incoming call packets for (i) controlling the switching of each call packet as function of said signalling bit included in said call packet and (ii) indicating the direction along which said call packet moves in said artery;
means for decrementing by 1 said distance word included in an incoming data packet;
means for detecting a null value in said decremented distance word of said incoming data packet;
second control means responsive to said incoming data packets for controlling the switching of each of said data packets as a function of said first signalling bit included in said data packet and as a function of said decremented distance word, and
three means responsive to the first and second control means respectively associated with said 3 output multiplex ways for storing write addresses of said incoming packets written in said buffer memory in chronological order, said write addresses being read cyclically under the control of a time base to produce read addresses of outgoing packets supplied to said buffer memory.

5. The packet time-division switching network as claimed in claim 3, wherein said distance word included in a data packet has a value equal to the two's complement of a distance word representing the distance measured during said communication set-up phase.

6. A packet time-division switching network comprising J chain-type sub-networks, where J is an integer, and a first central switching means to which said sub-networks are respectively connected by bidirectional connection multiplex ways,
each of said sub-networks comprising I switches, where I is an integer, said switches being chain-connected to form a bidirectional packet transmission artery, each switch connecting a bidirectional connection multiplex way to said artery, first and second of said connection multiplex ways being respectively connected to first and second of said switches respectively included in first and second of said sub-networks,
each of said switches comprising:
entry means for detecting incoming packets in 3 parallel input multiplex ways, the parallel multiplex way transmitting the incoming packets synchronously;
each incoming packet including a distance word and a signalling bit for indicating a transmission direction of said packet in said artery, said packets including call packets transmitted during a communication set-up phase and data packets transmitted during a data transmission phase of communication;
means linked to said entry means for multiplexing said packets transmitted by said entry means;
a buffer memory for temporarily storing said packets;
means for demultiplexing said packets read cyclically in said buffer memory and for supplying said cyclically read packets to 3 output multiplex ways;
means for processing the distance word included in each incoming packet and for switching said incoming packet as a function of (i) the signalling bit included in said packet, (ii) whether said packet is a call or data packet, and (iii) the value of said distance word, said distance word representing the number of switches to be crossed by said packet to be routed from a transmission source of said packet to a destination to which said packet is addressed; and
wherein call packets transmitted by said first and second connection multiplex ways are disseminated through said first central switching means to all said sub-networks, the call packets transmitted by said first and second connection multiplex ways including (i) first and second distance words for respectively indicating first and second distances in said first and second sub-networks, and (ii) a relative address representing switching performed by said first central switching means, said distances and address being included as distance words in said data packets for routing said packets during a communication phase between said first and second connection multiplex ways through said first central switching means.

7. The packet time-division switching network as claimed in claim 6, wherein said packet includes a second signalling bit for indicating whether said packet is (a) to be transmitted towards said first central switching means or is to be transmitted from said switching means, said processing and switching means included in a switch of a sub-network including first supplementary means activated when said incoming packet is a call packet for (i) controlling switching of said packet as a function of the second signalling bit and (ii) selectively disseminating said packet to all said sub-networks and to connection multiplex ways connected to said sub-network.

8. Packet time-division switching network as claimed in claim 6, wherein said first central switching means comprises:
entry means for detecting incoming packets in J parallel input multiplex ways connected respectively to said J sub-networks for synchronously transmitting said incoming packets, means linked to said entry means for multiplexing said packets transmitted by said entry means;

a buffer memory for temporarily storing said packets;

means for demultiplexing said packets read cyclically in said buffer memory and for coupling the demultiplexed packets to J parallel output multiplex ways linked respectively to said J sub-networks; and means for processing said second signalling bit and said distance and address words included in each incoming packet as a function of whether the packet is a communication call or data packet, said means for processing switching said packet as a function of its nature and the value of said address word.

9. The packet time-division switching network as claimed in claim 8, wherein each of said incoming packets includes parallel-bit groups, said multiplexing means in said first central switching means including means for sequentially converting said parallel-bit groups of said incoming packets into serial diagonal packets, each of said parallel-bit groups being sequentially derived in a time sequential diagonal configuration of said diagonal packets, said demultiplexing means including means for reverse converting said diagonal packets read into said packets transmitted to said output multiplex ways.

10. The packet time-division switching network as claimed in claim 8, wherein said processing and switching means included in said first central switching means comprises:

means for detecting call packets and data packets in said incoming packet;

means for pre-setting said second signalling bit of an incoming call packet to a predetermined state, said predetermined state indicating to said switches of said sub-networks that said call packet is a packet (i) to be disseminated and (ii) originating from said first central switch;

first control means activated in response to said incoming packet being a call packet for controlling switching of said packet to said J outgoing multiplex ways so as to feed J call packets derived from said incoming call packet respectively to said J sub-networks;

means for attributing to said address word for each of said J call packets to be disseminated and derived from said incoming call packet a value representing a relative address of said output multiplex way to which said packet is switched, said relative address being relative to an absolute address of said input multiplex way whence said incoming call packet originates;

second control means activated in response to said incoming packet being a data packet for deducing an absolute address of said output multiplex way to which said incoming packet is to be switched, said absolute address being deduced from (i) said distance word included in said packet and representing said relative address of said output multiplexed way, and (ii) said absolute address of said incoming multiplex way whence said packet originates, said second control means controlling switching of said packet from said absolute address of said output multiplexed way, and J means respectively associated with said J output multiplexed ways for storing said write addresses of said incoming packets in said buffer memory in chronological order under the control of said first and second control means, said write addresses being read cyclically under the control of a time base for deriving said read addresses of output packets supplied to said buffer memory.

11. The packet time-division switching network as claimed in claim 6, wherein said distance word corresponding to said first central switching means included in a data packet is equal to the two's complement of the address word corresponding to the relative address measured during said communication set-up phase.

12. The packet time-division switching network as claimed in claim 6 wherein said first central switching means comprises means for inserting an identification number respectively attributed to said first central switching means in each of said disseminated call packets.

13. The packet time-division switching network as claimed in claim 6, further comprising a second central switching means similar to said first central switching means, said second central switching means being connected to each of said J sub-networks for load sharing switching of said data packets with said first central switching means.

* * * * *